US012655919B2

(12) United States Patent
Wei et al.

(10) Patent No.: US 12,655,919 B2
(45) Date of Patent: Jun. 16, 2026

(54) VALVE ACTUATOR

(71) Applicant: Siemens Schweiz AG, Zürich (CH)

(72) Inventors: Yong Qiu Wei, Beijing (CN); Ning Zhan, Beijing (CN)

(73) Assignee: Siemens Schweiz AG, Zürich (CH)

( * ) Notice: Subject to any disclaimer, the term of this patent is extended or adjusted under 35 U.S.C. 154(b) by 0 days.

(21) Appl. No.: 18/825,178

(22) Filed: Sep. 5, 2024

(65) Prior Publication Data

US 2025/0075822 A1     Mar. 6, 2025

(30) Foreign Application Priority Data

Sep. 5, 2023     (CN) .......................... 202311142031.6

(51) Int. Cl.
   *F16K 35/02*          (2006.01)
   *F16K 31/60*          (2006.01)
(52) U.S. Cl.
   CPC ............ *F16K 35/027* (2013.01); *F16K 31/60* (2013.01); *F16K 35/025* (2013.01)
(58) Field of Classification Search
   CPC ..... F16K 35/022; F16K 35/025; F16K 35/027
   See application file for complete search history.

(56) References Cited

U.S. PATENT DOCUMENTS

| | | | | |
|---|---|---|---|---|
| 1,049,662 | A | * | 1/1913 | Brown et al. ......... F16K 35/025 |
| | | | | 251/109 |
| 2,912,218 | A | * | 11/1959 | Stillwagon ............ F16K 31/602 |
| | | | | D23/244 |
| 8,267,372 | B2 | | 9/2012 | Masamura |
| 8,490,943 | B2 | | 7/2013 | Bühler et al. |
| 9,709,189 | B2 | * | 7/2017 | Matalon ................ F16K 35/025 |
| 10,437,278 | B2 | | 10/2019 | Swayne et al. |
| 10,731,765 | B2 | | 8/2020 | Stulz |
| 2010/0243930 | A1 | | 9/2010 | Long |
| 2021/0222792 | A1 | * | 7/2021 | Liu ........................ F16K 1/221 |

FOREIGN PATENT DOCUMENTS

| | | |
|---|---|---|
| CN | 102155578 A | 8/2011 |
| CN | 106989194 A | 7/2017 |
| CN | 109899588 A | 6/2019 |

(Continued)

*Primary Examiner* — Kevin F Murphy
(74) *Attorney, Agent, or Firm* — Laurence A. Greenberg; Werner H. Stemer; Ralph E. Locher

(57)     ABSTRACT

A valve actuator includes a support body, an operating member and a locking member. The support body is provided with a plurality of locking structures. The plurality of locking structures are distributed in a circumferential direction, with an axis surrounded by the circumferential direction being defined as a first axis. The operating member is rotatably connected to the support body about the first axis. The locking member is movably connected to the operating member. The operating member can rotate relative to the support body to a plurality of locked positions. Each locked position corresponds to one of the locking structures. When the operating member is in the locked position, the locking member can move relative to the operating member to engage with the corresponding locking structure to prevent the operating member from rotating relative to the support body. The valve actuator can enable locking and unlocking of the operating member.

12 Claims, 8 Drawing Sheets

(56) References Cited

FOREIGN PATENT DOCUMENTS

| CN | 113175554 | A | 7/2021 | |
|----|-----------|---|--------|---|
| CN | 114555994 | A | 5/2022 | |
| EP | 4086492 | A1 * | 11/2022 | ......... F24D 19/1018 |
| JP | 5210247 | B2 | 6/2013 | |
| KR | 20190142968 | A | 12/2019 | |

* cited by examiner

VALVE ACTUATOR

CROSS-REFERENCE TO RELATED APPLICATION

This application claims the priority, under 35 U.S.C. § 119, of Chinese Patent Application CN 202311142031.6, filed Sep. 5, 2023; the prior application is herewith incorporated by reference in its entirety.

FIELD AND BACKGROUND OF THE INVENTION

The present invention relates to the field of valves, and in particular to a valve actuator.

DESCRIPTION OF THE RELATED ART

A valve actuator is a machine for driving a valve. The valve actuator is generally provided with a manual operating mechanism. The manual operating mechanism is used to manually drive a valve stem of the valve. The manual operating mechanism of the existing valve actuator cannot be locked after the operation is completed, and it is difficult to maintain the valve stem in a fixed position.

SUMMARY OF THE INVENTION

It is accordingly an object of the invention to provide a valve actuator, which overcomes the hereinafore-mentioned disadvantages of the heretofore-known devices of this general type and which has a manual operating mechanism that can be locked after operation.

With the foregoing and other objects in view there is provided, in accordance with the invention, a valve actuator, which includes a support body, an operating member and a locking member. The support body is provided with a plurality of locking structures. The plurality of locking structures are distributed in a circumferential direction, with an axis surrounded by the circumferential direction being defined as a first axis. The operating member is rotatably connected to the support body about the first axis. The locking member is movably connected to the operating member. The operating member can rotate relative to the support body to a plurality of locked positions. Each locked position corresponds to one of the locking structures. When the operating member is in the locked position, the locking member can move relative to the operating member to engage with the corresponding locking structure to prevent the operating member from rotating relative to the support body.

The valve actuator can enable locking and unlocking of the operating member by using the locking structures and the locking member.

In another exemplary embodiment of the valve actuator, a movement trajectory of the locking member relative to the operating member is configured to be gradually away from the first axis in the circumferential direction. The valve actuator further includes a locking drive member. The locking drive member is rotatably connected to the operating member about the first axis. The locking drive member can push the locking member to move relative to the operating member by rotating relative to the operating member. This can facilitate operation.

In still another exemplary embodiment of the valve actuator, the movement trajectory of the locking member relative to the operating member is a straight line trajectory or an arc trajectory perpendicular to the first axis. This makes the overall structure more compact and helps save space.

In a further exemplary embodiment of the valve actuator, the locking drive member is provided with a driving hole extending therethrough in a first direction, the first direction being parallel to the first axis. The driving hole extends in a radial direction of rotation of the operating member. The locking member passes through the driving hole. The locking drive member rotating relative to the operating member can push the locking member to move relative to the operating member by using a wall of the driving hole. Such a structure is simple, is easy to manufacture and has a good stability.

In a further exemplary embodiment of the valve actuator, the operating member includes a rotating shaft portion and a knob portion. The rotating shaft portion is rotatably inserted in the support body about the first axis. The knob portion is located on a front side of the rotating shaft portion in the first direction and is fixedly connected to the rotating shaft portion. A rear end face of the knob portion in the first direction is provided with a slide groove recessed in the first direction. The locking member is inserted in the slide groove and can slide in the slide groove. The locking drive member is disposed on a rear side of the knob portion in the first direction. This makes the overall structure more compact and helps save space.

In a further exemplary embodiment of the valve actuator, the operating member includes a rotating shaft portion. The rotating shaft portion is rotatably inserted in the support body about the first axis. The locking drive member includes an annular pivoting portion. The pivoting portion is rotatably sleeved on the rotating shaft portion. Such a structure saves space and facilitates assembly.

In a further exemplary embodiment of the valve actuator, an annular groove extending in the circumferential direction is recessed from a surface of the rotating shaft portion. An inner edge of the pivoting portion is provided with a plurality of hooks. The plurality of hooks are distributed in the circumferential direction and form a snap-fit connection with a wall of the annular groove to prevent the locking drive member from moving relative to the operating member in a direction parallel to the first axis. Such a structure can facilitate assembly.

In a further exemplary embodiment of the valve actuator, the operating member includes a knob portion. A circumferential outer surface of the knob portion is provided with a notch. A front end of the locking drive member in a radial direction of rotation of the operating member is provided with an operating portion. The operating portion is disposed in the notch. This facilitates operation and can also make the overall structure more compact.

In a further exemplary embodiment of the valve actuator, the locking drive member is provided with a first limiting structure, and the operating member is provided with a second limiting structure. One of the first limiting structure and the second limiting structure is a protrusion, and the other thereof is provided with a groove mating with the protrusion. When the locking drive member is located in a limiting position relative to the operating member, the protrusion is embedded in the groove to prevent the locking drive member from rotating relative to the operating member. During rotation of the locking drive member into or out of the limiting position, a wall, against which the protrusion abuts, of the groove can be elastically deformed to allow the locking drive member to continue to rotate. The limiting position corresponds to a state where the locking member is engaged with the locking structure or to a state where the locking member is disengaged from the locking structure. In this way, a stuck feeling can be generated when the operating member rotates to the limiting position, and it is helpful to keep the locking drive member in the limiting position.

In a further exemplary embodiment of the valve actuator, the locking structures are slots. When the operating member is located in the locked position, the locking member can move to be inserted into the corresponding slot to prevent the operating member from rotating relative to the support body. Such a structure is easy to manufacture and has a good stability.

In a further exemplary embodiment of the valve actuator, the operating member includes a knob portion. The support body has a top face opposite the knob portion in a first direction, the first direction being parallel to the first axis. The slots are recessed from a part of the top face that is opposite the knob portion in the first direction. The locking member is disposed between the knob portion and the top face in the first direction. This makes the overall structure more compact and helps save space.

In a further exemplary embodiment of the valve actuator, a cross section of the slot perpendicular to an insertion direction of the locking member is in the shape of a triangle with an apex oriented in an opposite direction of the first direction. A cross section of an end, which is configured to be inserted into the slot, of the locking member perpendicular to the insertion direction of the locking member is in the shape of a triangle with an apex oriented in the opposite direction of the first direction. Such a structure has a good stability and can also facilitate the arrangement of a larger number of slots, thereby improving the accuracy of manual control of the valve actuator.

Other features which are considered as characteristic for the invention are set forth in the appended claims.

Although the invention is illustrated and described herein as embodied in a valve actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
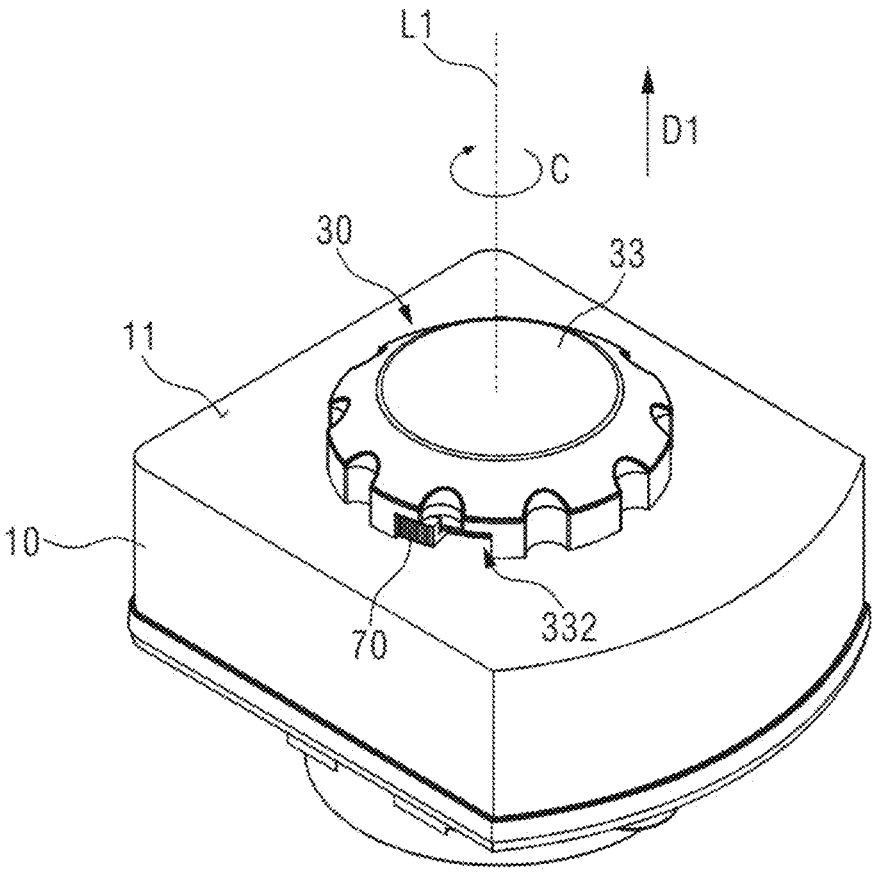
FIG. 1 is a diagrammatic, perspective view of an exemplary embodiment of a valve actuator.

For the sake of better understanding of the technical features, objects and effects of the present invention, particular embodiments of the present invention will now be described by reference to the accompanying drawings, and in the drawings like numerals refer to components with the same structure or with similar structure but the same function.

The term "exemplary" herein means "serving as an example, instance or description," and any "exemplary" illustration and embodiment herein should not be interpreted as a more preferred or a more advantageous technical solution.

The terms "first," "second," etc. herein do not indicate their importance or order, etc., but are only used to indicate the differences between them for the convenience of description of the document.

For clarity of the drawings, only the relevant parts of the present invention are diagrammatically shown throughout the drawings, but they do not represent the actual structure of a product.

Figure 2:
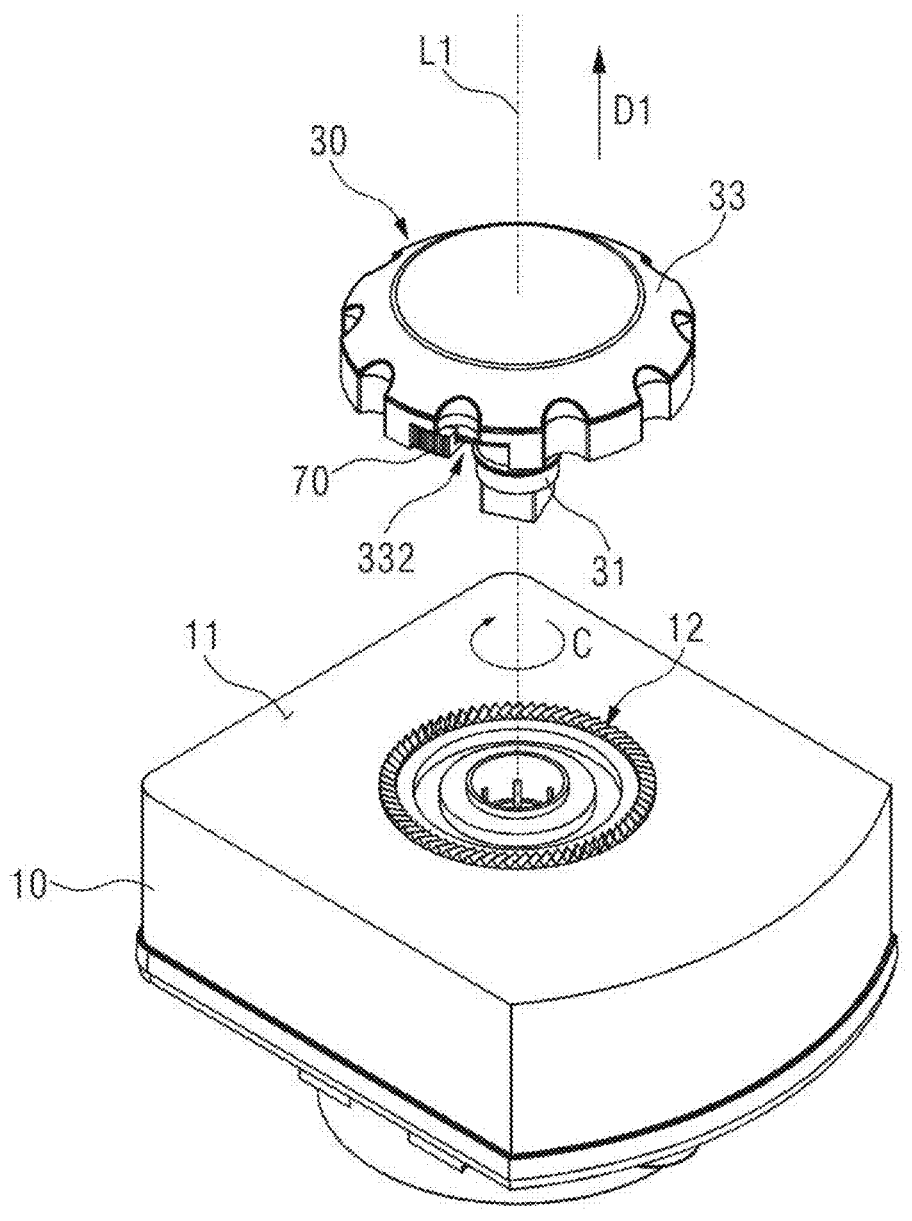
FIG. 2 is an exploded, perspective view of the valve actuator shown in FIG. 1.
Figure 3:
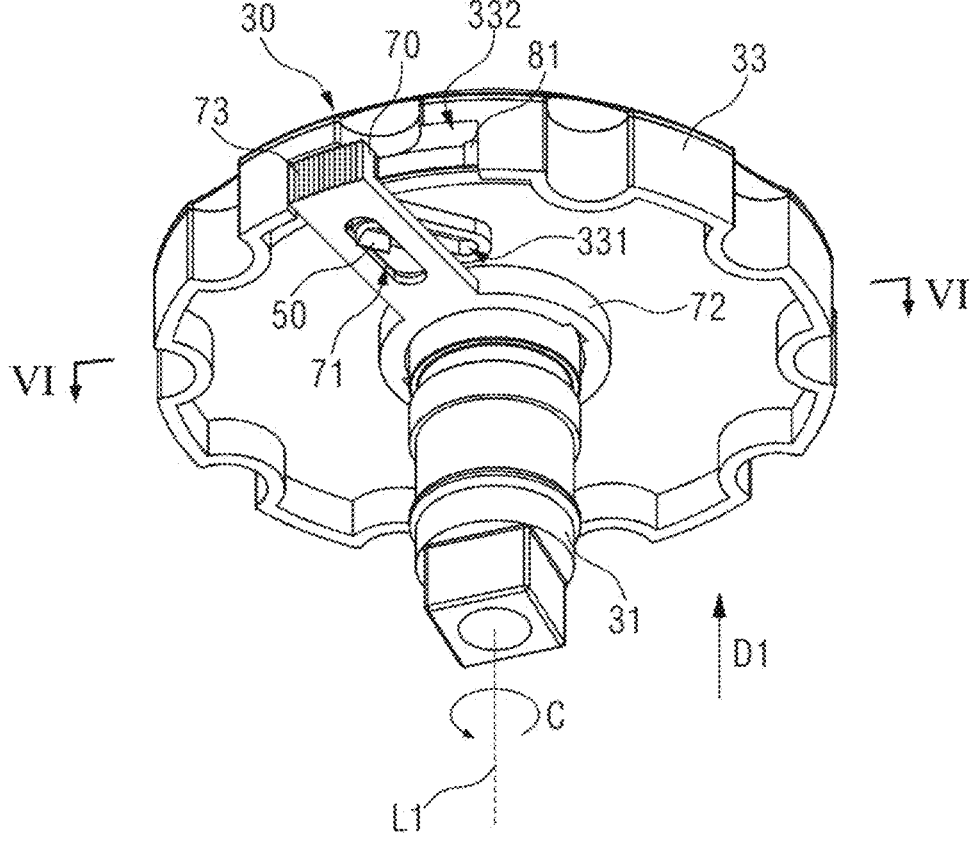
FIG. 3 is a perspective view of a partial structure of the valve actuator shown in FIG. 1.
Figure 4:
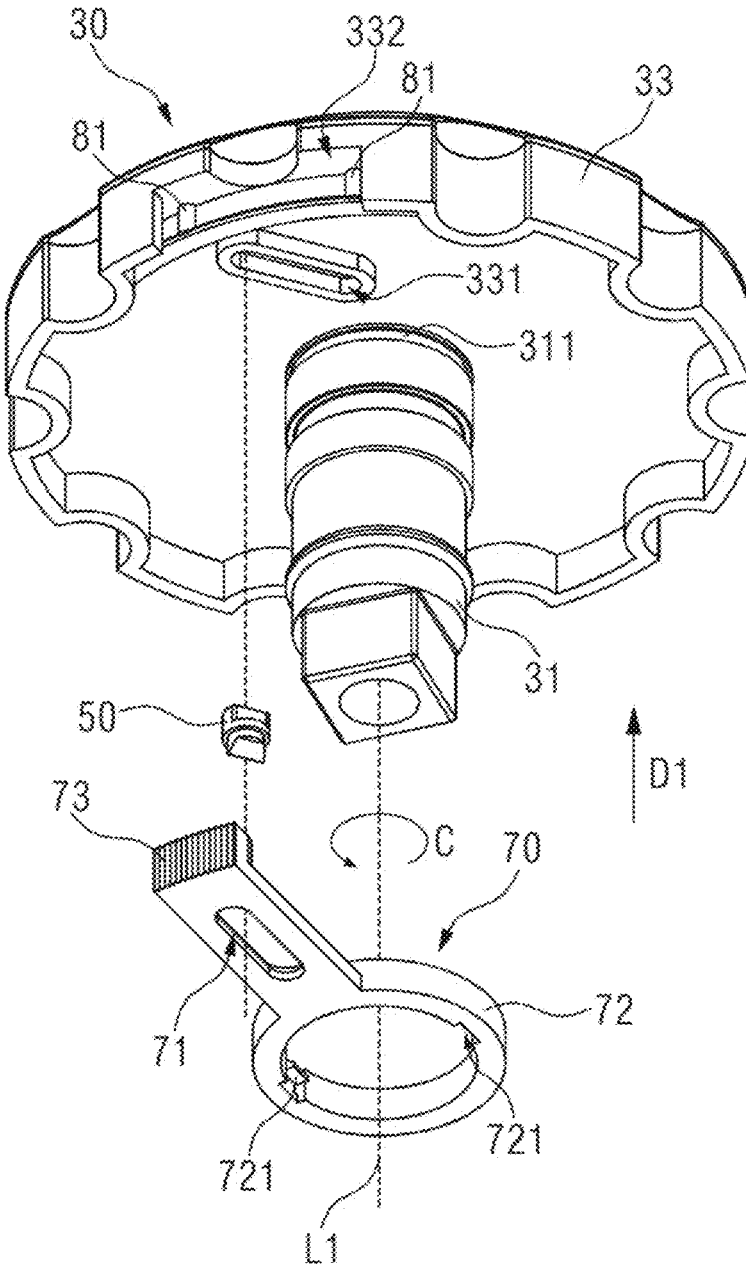
FIG. 4 is an exploded, perspective view of the structure shown in FIG. 3.

Referring now to the figures of the drawings in detail and first, particularly, to FIG. 1 thereof, there is seen a diagrammatic structural illustration of an exemplary embodiment of a valve actuator. FIG. 2 is an exploded view of the valve actuator shown in FIG. 1. FIG. 3 is a diagrammatic view of a partial structure of the valve actuator shown in FIG. 1. FIG. 4 is an exploded view of the structure shown in FIG. 3. As shown in FIGS. 1 to 4, the valve actuator includes a support body 10, an operating member 30 and a locking member 50.

As shown in FIG. 2, the support body 10 is provided with a plurality of locking structures 12. FIG. 2 only diagrammatically shows one of the locking structures 12. In this exemplary embodiment, the locking structure 12 is, for example, a slot. The plurality of locking structures 12 are distributed in a circumferential direction C, with an axis surrounded by the circumferential direction being defined as a first axis L1. In this exemplary embodiment, the plurality of locking structures 12 are continuously disposed in a ring shape in the circumferential direction C, but are not limited thereto. In other exemplary embodiments, the number of locking structures 12 may be adjusted as required, or the locking structures may be disposed at intervals.

As shown in FIGS. 1 and 2, the operating member 30 is rotatably connected to the support body 10 about the first axis L1. The operating member 30 is configured to be manually operated by an operator to drive a valve stem of the valve to rotate. The valve actuator, for example, further includes a transmission structure and an electric mechanism. The rotating operating member 30 may, for example, drive the valve stem of the valve to rotate by using the transmission structure, and the electric mechanism may, for example, also drive the valve stem of the valve to rotate by using the transmission structure.

The locking member 50 is movably connected to the operating member 30. Specifically, as shown in FIGS. 3 and 4, the operating member 30 is provided with a slide groove 331, and the locking member 50 is inserted in the slide groove 331 and can slide in the slide groove 331. Such a structure is simple and is easy to manufacture. However, it is not limited to this. In other exemplary embodiments, the locking member 50 may be movably connected to the operating member 30 via other structures.

Figure 5:
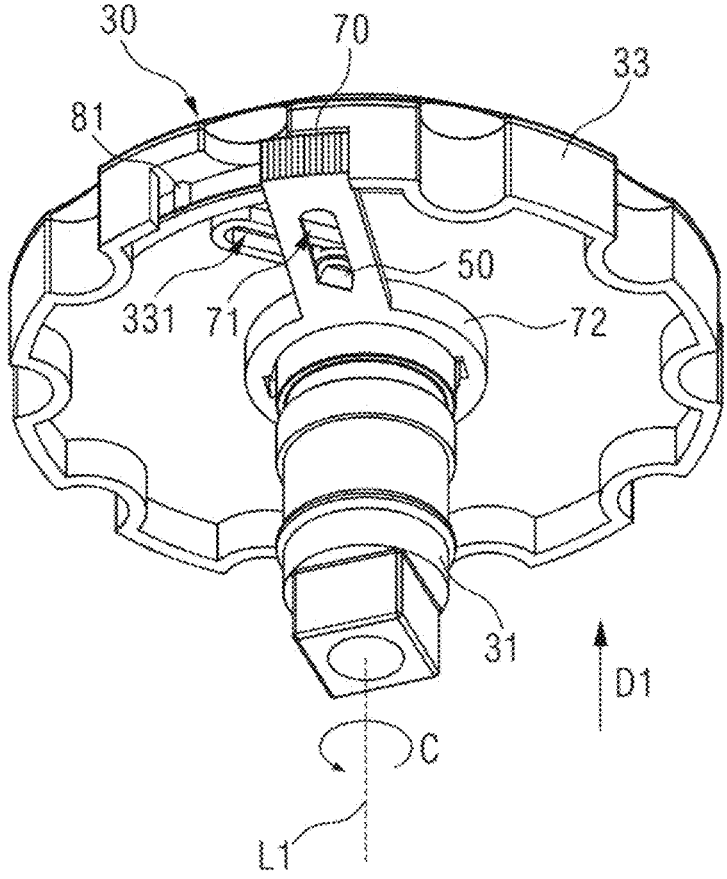
FIG. 5 is a perspective view of the structure shown in FIG. 3 in another state.

The operating member 30 can rotate relative to the support body 10 to a plurality of locked positions. Each locked position corresponds to one of the locking structures 12. When the operating member 30 is in the locked position, the locking member 50 can move relative to the operating member 30 to engage with the corresponding locking structure 12 to prevent the operating member 30 from rotating relative to the support body 10. FIG. 5 is a diagrammatic view of the structure shown in FIG. 3 in another state. Referring to FIGS. 3 and 5, specifically, when the operating member 30 is in the locked position, the locking member 50 can slide along the slide groove 331 from the position shown in FIG. 5 to the position shown in FIG. 3, so as to be inserted into the slot of one of the locking structures 12. After insertion, the operating member 30 can be prevented from rotating relative to the support body 10 by the mutual abutment between the locking member 50 and a wall of the slot, and the rotation position of the operating member 30 is locked. When the operating member 30 needs to be rotated, the locking member 50 slides along the slide groove 331 from the position shown in FIG. 3 to the position shown in FIG. 5, and the locking member 50 is disengaged from the slot of the locking structure 12, and the operating member 30 is unlocked and can rotate relative to the support body 10. The valve actuator of this exemplary embodiment can enable locking and unlocking of the operating member.

In this exemplary embodiment, the locking structure 12 is a slot, which is easy to manufacture and has a good stability. In other exemplary embodiments, the locking structure 12 may be other structures rather than the slot. For example, the locking structure 12 may be configured as a hole, and the locking member 50 may be provided with a pin that can be inserted into the hole. However, it is not limited to this.

In an exemplary embodiment, a movement trajectory of the locking member 50 relative to the operating member 30 is configured to be gradually away from the first axis L1 in the circumferential direction C. Specifically, as shown in FIG. 4, in this exemplary embodiment, the movement trajectory of the locking member 50 relative to the operating member 30 (embodied as an extension trajectory of the slide groove 331) is, but is not limited to, a straight line trajectory perpendicular to the first axis L1. In other exemplary embodiments, the movement trajectory of the locking member 50 relative to the operating member 30 may be an arc trajectory perpendicular to the first axis L1. The movement trajectory of the locking member 50 relative to the operating member 30 being perpendicular to the first axis L1 is conducive to saving space. However, it is not limited to this. In other exemplary embodiments, the movement trajectory of the locking member 50 relative to the operating member 30 may not be perpendicular to the first axis L1.

As shown in FIGS. 3 to 5, the valve actuator further includes a locking drive member 70. The locking drive member 70 is rotatably connected to the operating member 30 about the first axis L1. The locking drive member 70 can push the locking member 50 to move relative to the operating member 30 by rotating relative to the operating member 30. Specifically, the locking drive member 70 is provided with a driving hole 71 extending therethrough in a first direction D1. The first direction D1 is parallel to the first axis L1. The driving hole 71 extends in a radial direction of rotation of the operating member 30, and the radial direction of rotation of the operating member 30 is a radial direction with the first axis L1 as the axis. The locking member 50 passes through the driving hole 71. The locking drive member 70 rotating relative to the operating member 30 can push the locking member 50 to move relative to the operating member 30 by using a wall of the driving hole 71. Such a structure is simple, is easy to manufacture and has a good stability.

As shown in FIGS. 3 to 5, in an exemplary embodiment, the operating member 30 includes a rotating shaft portion 31 and a knob portion 33. The rotating shaft portion 31 is rotatably inserted in the support body 10 about the first axis L1. The knob portion 33 is located on a front side (i.e., an upper side in FIGS. 3 to 5) of the rotating shaft portion 31 in the first direction D1 and is fixedly connected to the rotating shaft portion 31. The slide groove 331 is recessed in the first direction D1 from a rear end face (i.e., a lower end face in FIGS. 3 to 5) of the knob portion 33 in the first direction D1. The locking member 50 has an upper end inserted in the slide groove 331, and a lower end configured to engage with the locking structure 12 to prevent the operating member 30 from rotating relative to the support body 10. The locking drive member 70 is disposed on a rear side (i.e., a lower side in FIGS. 3 to 5) of the knob portion 33 in the first direction D1. This makes the overall structure more compact and helps save space.

As shown in FIGS. 3 to 5, in an exemplary embodiment, the locking drive member 70 includes an annular pivoting portion 72. The pivoting portion 72 is rotatably sleeved on the rotating shaft portion 31. Such a structure saves space and facilitates assembly.

As shown in FIG. 4, in an exemplary embodiment, an annular groove 311 extending in the circumferential direction C is recessed from a surface of the rotating shaft portion 31. An inner edge of the pivoting portion 72 is provided with two hooks 721. The two hooks 721 are evenly distributed in the circumferential direction C and form a snap-fit connection with a wall of the annular groove 311 to prevent the locking drive member 70 from moving relative to the operating member 30 in a direction parallel to the first axis L1. During assembly, the rotating shaft portion 31 is inserted into a central hole of the pivoting portion 72 in an opposite direction from the first direction D1 until the hooks 721 form a snap-fit connection with the wall of the annular groove 311, and the assembly of the two is completed. In other exemplary embodiments, the number of hooks 721 may be adjusted as required. Such a structure can facilitate assembly.

As shown in FIGS. 1 to 3, in an exemplary embodiment, a circumferential outer surface of the knob portion 33 is provided with a notch 332. A front end of the locking drive member 70 in a radial direction of rotation of the operating member 30 is provided with an operating portion 73. The operating portion 73 is disposed in the notch 332. This facilitates operation and can also make the overall structure more compact.

Figure 6:
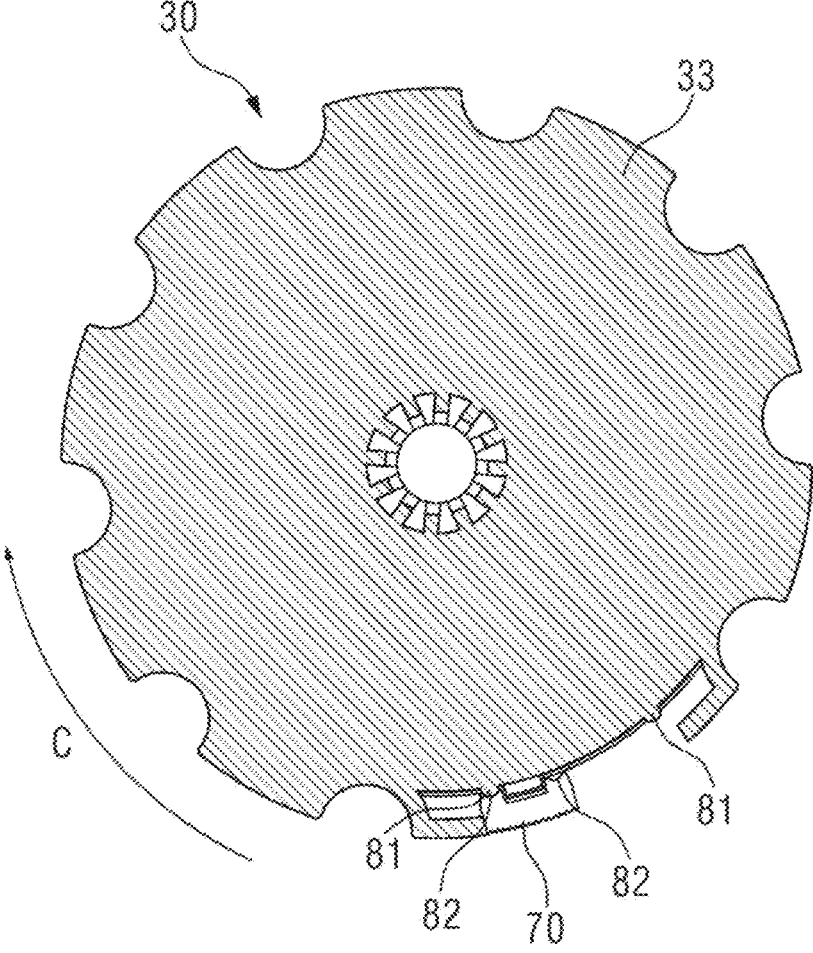
FIGS. 6 to 8 are cross-sectional views illustrating a mating relationship between a protrusion and a groove when a locking drive member is in different rotation positions.
Figure 7:
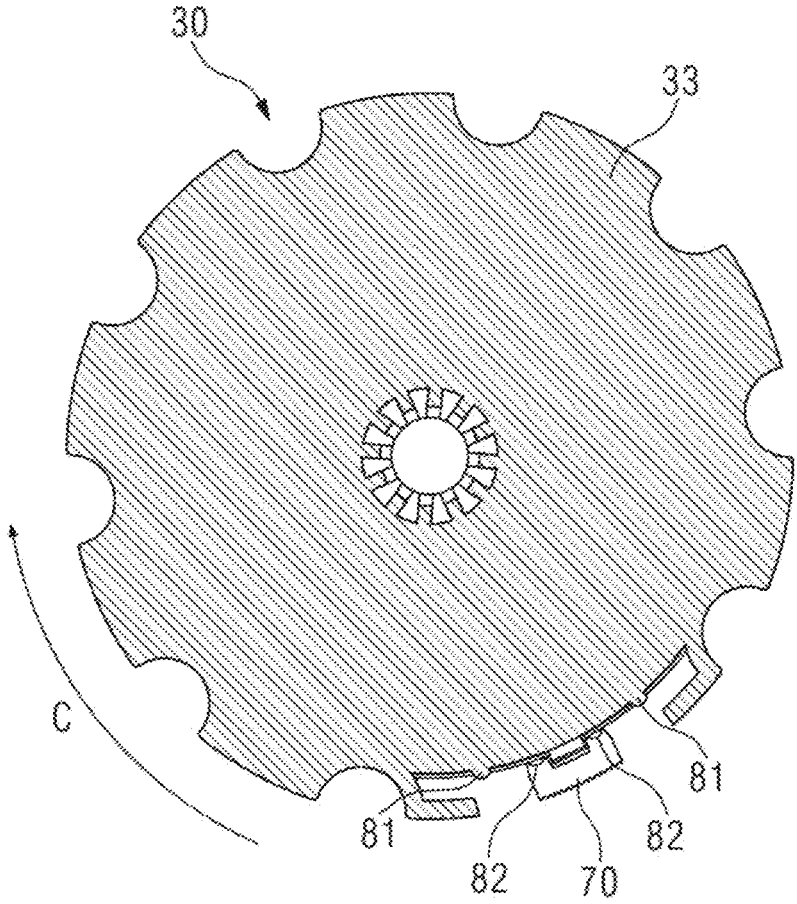
Figure 8:
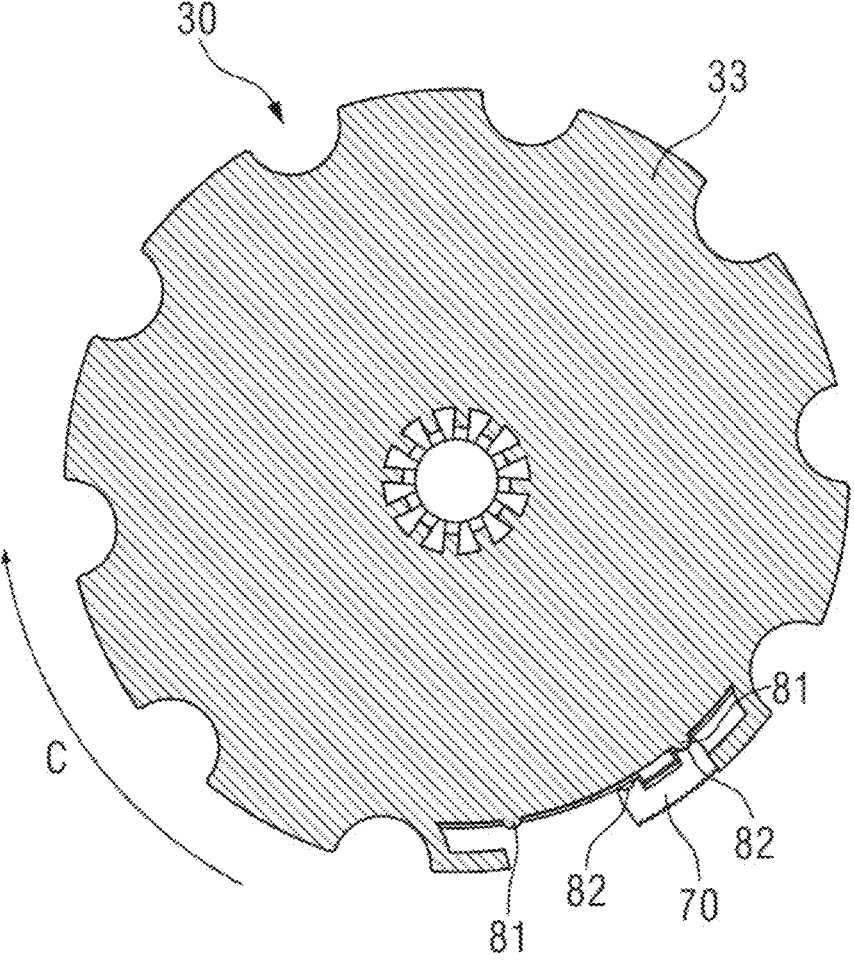

In an exemplary embodiment, the locking drive member 70 is provided with two first limiting structures, and the operating member 30 is provided with two second limiting structures. One first limiting structure and one second limiting structure form a limiting group. One of the first limiting structure and the second limiting structure is a protrusion 81, and the other thereof is provided with a groove 82 mating with the protrusion 81. FIG. 6 is a cross-sectional view along line VI-VI in FIG. 3. As shown in FIG. 6, in this exemplary embodiment, the protrusion 81 is provided on the knob portion 33, and the groove 82 is provided on the locking drive member 70. However, it is not limited to this. As shown in FIG. 6, the protrusion 81 on the left side and the groove 82 on the left side form a limiting group, and the protrusion 81 on the right side and the groove 82 on the right side form another limiting group. FIG. 6 to FIG. 8 sequentially show three states of the locking drive member 70 rotating in an opposite direction of the circumferential direction C. FIG. 6 corresponds to the state shown in FIG. 3 (i.e., corresponding to the state where the locking member 50 is engaged with the locking structure 12), and FIG. 8 corresponds to the state shown in FIG. 5 (i.e., corresponding to the state where the locking member 50 is disengaged from the locking structure 12).

When the locking drive member 70 moves to the position shown in FIG. 6 relative to the operating member 30, the protrusion 81 on the left side is embedded in the groove 82 on the left side to prevent the locking drive member 70 from rotating relative to the operating member 30. During rotation of the locking drive member 70 into or out of the position shown in FIG. 6, a wall, against which the protrusion 81 on the left side abuts, of the groove 82 on the left side can be elastically deformed to allow the locking drive member 70 to continue to rotate. When the locking drive member 70 moves to the position shown in FIG. 8 relative to the operating member 30, the protrusion 81 on the right side is embedded in the groove 82 on the right side to prevent the locking drive member 70 from rotating relative to the operating member 30. During rotation of the locking drive member 70 into or out of the position shown in FIG. 8, a wall, against which the protrusion 81 on the right side abuts, of the groove 82 on the right side can be elastically deformed to allow the locking drive member 70 to continue to rotate. In this way, a stuck feeling can be generated when the operating member rotates to the two limiting positions shown in FIG. 6 and FIG. 8, and it is helpful to keep the locking drive member in the two limiting positions. In other exemplary embodiments, the number of first limiting structures and the number of second limiting structures may be adjusted as required, for example, both may be set to one.

As shown in FIG. 2, in an exemplary embodiment, the support body 10 has a top face 11 opposite the knob portion 33 in the first direction D1. The slots of the locking structures 12 are recessed from a part of the top face 11 that is opposite the knob portion 33 in the first direction D1. The locking member 50 is disposed between the knob portion 33 and the top face 11 in the first direction D1. This makes the overall structure more compact and helps save space.

As shown in FIG. 2, in an exemplary embodiment, a cross section of the slot of the locking structure 12 perpendicular to an insertion direction of the locking member 50 is in the shape of a triangle with an apex oriented in an opposite direction from the first direction D1. As shown in FIG. 4, a cross section of an end (i.e., a lower end in FIG. 4), which is configured to be inserted into the slot, of the locking member 50 perpendicular to the insertion direction of the locking member 50 is also in the shape of a triangle with an apex oriented in the opposite direction from the first direction D1. Such a structure has a good stability and can also facilitate the arrangement of a larger number of slots, thereby improving the accuracy of manual control of the valve actuator.

It should be understood that, although the specification describes various embodiments, not each of the embodiments contains only one independent technical solution. This description of the specification is merely for the sake of clarity. Those skilled in the art should consider the specification as a whole, and the technical solutions in the various embodiments can also be combined as appropriate to form other embodiments that can be understood by those skilled in the art.

The series of detailed descriptions set forth above are merely specific illustrations of feasible embodiments of the present invention, and are not intended to limit the scope of protection of the present invention. Equivalent implementations or variations without departing from the technical spirit of the present invention, such as combinations, divisions, or repetitions of the features, should fall within the scope of protection of the present invention.

The following is a summary list of reference numerals and the corresponding structure used in the above description of the invention:

10 support body
11 top face
12 locking structure
30 operating member
31 rotating shaft portion
311 annular groove
33 knob portion
331 slide groove
332 notch
50 locking member
70 locking drive member
71 driving hole
72 pivoting portion
721 hook
73 operating portion
81 protrusion
82 groove
C circumferential direction
L1 first axis
D1 first direction

The invention claimed is:

1. A valve actuator, comprising:
a support body including a plurality of locking structures, said plurality of locking structures being distributed in a circumferential direction, with an axis surrounded by the circumferential direction being defined as a first axis;
an operating member rotatably connected to said support body about said first axis; and
a locking member movably connected to said operating member;
said operating member being rotatable relative to said support body to a plurality of locked positions, each of said locked positions corresponding to a respective one of said locking structures; and
said valve actuator further including a locking drive member, said locking drive member being rotatably connected to said operating member about said first axis, said locking drive member configured to push said locking member to move relative to said operating member by rotating relative to said operating member.

2. The valve actuator according to claim 1, wherein:
said locking member has a movement trajectory relative to said operating member configured to be directed gradually away from said first axis in the circumferential direction.

3. The valve actuator according to claim 2, wherein said movement trajectory of said locking member relative to said operating member is a straight line trajectory or an arc trajectory perpendicular to said first axis.

4. The valve actuator according to claim 1, wherein said locking drive member has a driving hole extending therethrough in a first direction and defining a wall of said driving hole, said first direction is parallel to said first axis, said driving hole extends in a radial direction of rotation of said operating member, said locking member passes through said driving hole, and said locking drive member rotating relative to said operating member is configured to push said locking member to move relative to said operating member by using said wall of said driving hole.

5. The valve actuator according to claim 4, wherein:

said operating member includes a rotating shaft portion and a knob portion, said rotating shaft portion is rotatably inserted in said support body about said first axis, said knob portion is located on a front side of said rotating shaft portion in said first direction and is fixedly connected to said rotating shaft portion;

a rear end face of said knob portion in said first direction has a slide groove recessed in said first direction, said locking member is inserted in said slide groove and is slidable in said slide groove; and said locking drive member is disposed on a rear side of said knob portion in said first direction.

6. The valve actuator according to claim 1, wherein said operating member includes a rotating shaft portion, said rotating shaft portion is rotatably inserted in said support body about said first axis, and said locking drive member includes an annular pivoting portion, said annular pivoting portion being rotatably sleeved on said rotating shaft portion.

7. The valve actuator according to claim 6, wherein:

said rotating shaft portion has a surface and an annular groove extending in the circumferential direction, being recessed from said surface and defining a wall of said annular groove; and said pivoting portion has an inner edge with a plurality of hooks, said plurality of hooks being distributed in the circumferential direction and forming a snap-fit connection with said wall of said annular groove to prevent said locking drive member from moving relative to said operating member in a direction parallel to said first axis.

8. The valve actuator according to claim 1, wherein said operating member includes a knob portion, said knob portion has a circumferential outer surface with a notch, and said locking drive member has a front end with an operating portion in a radial direction of rotation of said operating member, said operating portion being disposed in said notch.

9. The valve actuator according to claim 1, wherein:

said locking drive member has a first limiting structure, and said operating member has a second limiting structure;

one of said first limiting structure and said second limiting structure is a protrusion, and another of said first limiting structure and said second limiting structure has a groove mating with said protrusion, said groove defining a wall against which said protrusion is configured to abut;

upon said locking drive member being located in a limiting position relative to said operating member, said protrusion being embedded in said groove to prevent said locking drive member from rotating relative to said operating member;

during rotation of said locking drive member into or out of said limiting position, said wall defined by said groove being elastically deformable to allow said locking drive member to continue to rotate; and said limiting position corresponding to a state in which said locking member is engaged with said locking structure or to a state in which where said locking member is disengaged from said locking structure.

10. The valve actuator according to claim 1, wherein said locking structures are slots, and upon said operating member being located in one of said locked positions, said locking member being movable to be inserted into a corresponding slot to prevent said operating member from rotating relative to said support body.

11. The valve actuator according to claim 10, wherein said operating member includes a knob portion, said support body has a top face disposed opposite to said knob portion in a first direction, said first direction is parallel to said first axis, said slots are recessed from a part of said top face disposed opposite to said knob portion in said first direction, and said locking member is disposed between said knob portion and said top face in said first direction.

12. The valve actuator according to claim 11, wherein:

said slots have a cross section perpendicular to an insertion direction of said locking member, said cross section of said slots having a triangular shape with an apex oriented in direction opposite to said first direction; and said locking member has an end configured to be inserted into said slots, said end having a cross section perpendicular to said insertion direction of said locking member, and said cross section of said end having a triangular shape with an apex oriented in a direction opposite to said first direction.

\* \* \* \* \*